…

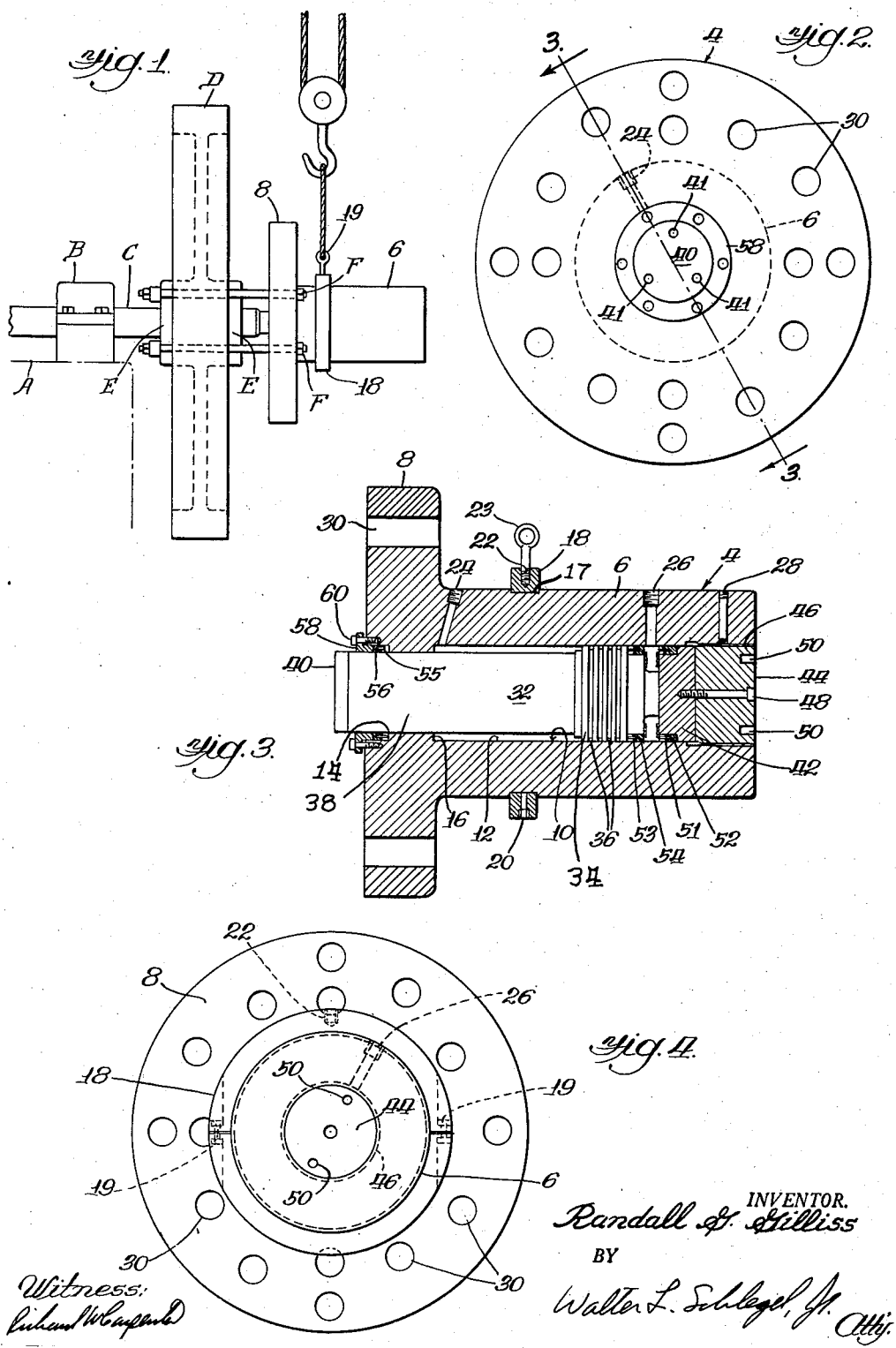

United States Patent Office 2,876,532
Patented Mar. 10, 1959

2,876,532

HYDRAULIC FORCING DEVICE

Randall G. Gilliss, Cincinnati, Ohio, assignor to American Steel Foundries, Chicago, Ill., a corporation of New Jersey Application December 30, 1954, Serial No. 478,849

3 Claims. (Cl. 29—252)

This invention relates to hydraulic forcing devices and more particularly to a device used for the forceable removal of gears or wheels from shafts or axles.

This invention comprehends a portable hydraulic pulling unit that greatly facilitates the removal of defective gears or wheels from associated shafts. In the past it has been necessary to employ complicated arrangements of jacks and rams to separate defective gears from their shafts.

Therefore, an object of this invention is to provide a simple, portable hydraulic gear forcing device.

Another object of the invention is to provide a rotatable mounting arrangement for a pulling device that will readily permit its alignment with the related gear.

A more specific object of the invention is to provide a suspension ring mounting for a gear pulling device that facilitates its transportation and accommodates its rotatable mounting.

Still another specific object of the invention is the provision of a specific pattern of holes in a flange member of a forcing device that permits a plurality of variable connections to an associated gear.

These and other objects of the invention will become apparent from an examination of the following description and drawings, wherein:

Figure 1 is a diagrammatic view of the invention shown connected to a press to illustrate the manner in which the invention is employed;

Figure 2 is a top plan view of a preferred embodiment of the invention;

Figure 3 is a sectional view taken along the line 3—3 of Figure 2, and

Figure 4 is a bottom plan view of the structure illustrated in Figure 2.

It will be noted that some of the parts have been intentionally omitted from some of the views where more clearly illustrated in other views.

Describing the invention in detail and referring first to Figure 3, it will be seen that the housing designated generally at 4 comprises a cylinder 6, and a flange 8 preferably formed integrally with the forward end of the cylinder. The flange 8 is preferably annular and generally flat and is disposed in a plane normal to the longitudinal axis of the cylinder.

A chamber 10 formed in the housing 4 comprises a central bore 12 extending lengthwise of the cylinder and a central bore 14 of the flange which is coaxial with the bore 12 but slightly smaller in diameter. The difference in diameters of the respective bores forms a stop shoulder 16 on the flange adjacent the cylinder, the function of which is hereinafter described.

The cylinder 6 may be provided with a groove 17 at its outer circumference in the plane of the center of gravity of the housing. A rotatable mounting comprising a swivel support ring 18 is movably positioned in said groove to accommodate the rotative movement of the housing about its longitudinal axis. The ring 18 comprises two halves secured at their respective ends by clamps 19, and may be provided with a conventional grease fitting 20, and with an aperture 22 for receiving an eye bolt 23 to accommodate the suspension and transportation of the housing.

The cylinder may be provided with a plurality of openings in the walls thereof, said openings being substantially normal to the bore 12. The forward opening 24, adjacent the flange 8 serving as a fluid port for air, and the opening 26, rearwardly thereof, serving as a fluid port for the hydraulic oil.

Adjacent the rearward end of the cylinder a threaded opening 28 generally normal to the bore 12 may be provided, the function of which is hereinafter explained.

The flange 8 may be provided with a plurality of holes 30 to accommodate a connection between a gear or wheel to be removed from a shaft by means of strain rods received in aligned holes of the gear and flange.

In order that the holes of the flange may be readily alignable with holes of various sizes spaced at various distances at the centers of the gears or yokes, a novel pattern is provided for their arrangement.

In the preferred embodiment illustrated in Figure 1, the holes are arranged in groups of four with one group to each quadrant of the flange. The holes of each group may be spaced from each other circumferentially at regular intervals, preferably 30°, and also spaced radially outward from each other at regular intervals. Thus, for example, the last hole of one group is radially aligned with the first hole of the succeeding group (progressing in a clockwise direction as seen in Figure 2), and spaced radially outward therefrom, so that each hole has a corresponding hole spaced circumferentially 180° from it on the opposite side of the flange, and radially spaced an equal distance from the center of the flange. Thus it will be understood that by rotating the flange, pairs of flange holes will be readily alignable with pairs of associated gear or yoke holes.

Slidably positioned in the chamber 8 of the housing in tight engagement with the walls thereof is a ram 32 which has at its rearward end a piston 34 with piston rings 36 in fluid-tight slidable engagement with the walls of the bore 12, and which has at its forward end a plunger 38 in fluid-tight slidable engagement with the bore 14. The contact end of the plunger 38 may be provided with a readily removable wear plate 40 having a serrated contact surface. The plate is secured to the plunger by bolts 41 and serves to engage various sizes of space adapters which connect the plunger to a gear shaft. The shoulder stop 16 by engaging the forward edge of the piston serves to prevent the ram from exceeding stroke at full pressure to retain it in the chamber.

A cylindrically shaped ram stop 42 may be positioned in the bore 12 immediately to the rear of the fluid port 26.

A cylinder plug 44 is threadably received in the rearward portion of the bore 12 immediately abutting the ram stop 42 and serves to retain the ram stop in position. A set screw (not shown) threadably received in opening 28 of the cylinder may bear on a copper slug 46 which in turn bears on the threads of the plug 44 to lock the plug in position. The plug is secured to the ram stop 42 by a cap screw 48 and may be provided with a plurality of apertures 50 formed in the rearward surface thereof, to accommodate a plug turning tool.

The forward end of the ram stop 42 and the rearward end of the ram 32 are provided with grooves 51 and 53 in which are received packings 52 and 54 which operate to seal the rear end of the chamber 10. Another packing 56 operative to seal the forward end of the chamber is received in a groove 55 of the flange and is retained in position by a circular gland 58 secured to the flange by cap screw 60.

It is to be understood that the housing of the chamber will be accurately bored and ground to a smooth finish to provide excellent contact with the piston rings of the ram.

To describe the operation of the device, the housing may be suspended by the eye bolt 23 to be rotatable on the swivel ring 18 and transported by a crane up to the press A, which has a bearing B mounting a shaft C which has a gear D thereon.

As will be seen in Figure 1, the connection to the associated gear D and shaft C may be made with the use of conventional yokes E and strain rods F. The yokes are positioned on opposite sides of the gear and secured by strain studs. The swivel ring 18 permits the rotation of the housing, while it is suspended by the eye bolt 23 to allow the alignment of the apertures of the flange with the strain rods. The rods are then bolted to the flange with the plate 40 of the plunger abutting the shaft of the press.

The cylinder is then connected to an air line at port 24 and a hydraulic fluid line and pumped through port 26. When the oil pump is operated, hydraulic pressure is supplied to the cylinder forcing the ram forward. Because the plunger abuts the shaft, the cylinder and flange are moved rearwardly away from the shaft and pull the connected gear with it.

As the ram goes forward, the air in the forward portion of the bore 12 is forced out through the port 24. The cylinder is designed so that the shop air pressure can be connected to the port 24, if desired, allowing a constant back pressure to exist on the ram. Therefore, when it is desired to return the ram into the cylinder, the hydraulic fluid is released reducing the forward pressure, and the back air pressure will return the ram to original position and push the hydraulic fluid back to a receiver at the pump (not shown).

I claim:

1. In a hydraulic forcing device, a housing comprising a cylinder having an annular flange at one end thereof, said flange being provided with a plurality of apertures, said cylinder having a bore extending lengthwise thereof, a ram receivable in said bore, said ram having a plunger at one end thereof, and suspension means for said device, said means comprising a swivel ring surrounding said cylinder substantially at the center of gravity thereof and in circumferential grooved engagement therewith to permit the rotative movement of said cylinder about its longitudinal axis.

2. In a housing for a hydraulic forcing device, a cylinder having an annular flange at one end thereof, said flange and said cylinder having coaxially aligned bores extending lengthwise of the housing, said flange being provided with a plurality of apertures arranged in a certain pattern, and rotatable suspension means for said cylinder, said means comprising a swivel ring positioned in a groove circumferentially surrounding said cylinder to permit the rotative movement of said cylinder about its longitudinal axis.

3. In a portable hydraulic forcing device, housing means comprising cylinder means and flange means formed integrally therewith, ram means comprising plunger means and piston means received in a bore of said housing means for reciprocating movement relative thereto, stop means to retain said ram means in said housing means, means to rotatably mount said housing to permit alignment thereof with a work piece, said mounting means comprises a suspension ring removably positioned in a groove circumferentially surrounding said cylinder means substantially at the center of gravity of said housing means, means to secure said flange means to an outside gear member, means on said plunger means to engage an outside gear shaft member, and hydraulic means to urge said plunger through said flange means to pull the gear member from the gear shaft member.

References Cited in the file of this patent

UNITED STATES PATENTS

| 844,032 | Moore | Feb. 12, 1907 |
| 1,522,983 | Strassner | Jan. 13, 1925 |
| 2,003,648 | Frye et al. | June 4, 1935 |
| 2,003,756 | Nagel | June 4, 1935 |
| 2,252,036 | Rummer | Aug. 12, 1941 |

FOREIGN PATENTS

| 377,993 | Germany | Mar. 17, 1922 |